US012651184B2

(12) United States Patent
Chang et al.

(10) Patent No.: US 12,651,184 B2
(45) Date of Patent: Jun. 9, 2026

(54) ELECTRONIC DEVICE AND METHOD FOR PERFORMING MONTE CARLO ANALYSIS BASED ON QUANTUM CIRCUIT

(71) Applicant: Industrial Technology Research Institute, Hsinchu (TW)

(72) Inventors: Yeong-Jar Chang, Hsinchu County (TW); Jason Gemsun Young, New Taipei City (TW); Ying Wei Tseng, New Taipei City (TW)

(73) Assignee: Industrial Technology Research Institute, Hsinchu (TW)

( * ) Notice: Subject to any disclaimer, the term of this patent is extended or adjusted under 35 U.S.C. 154(b) by 434 days.

(21) Appl. No.: 18/327,855

(22) Filed: Jun. 1, 2023

(65) Prior Publication Data

US 2024/0211787 A1 Jun. 27, 2024

(30) Foreign Application Priority Data

Dec. 21, 2022 (TW) .................................. 111149121

(51) Int. Cl.
*G06N 10/20* (2022.01)
(52) U.S. Cl.
CPC .................................... *G06N 10/20* (2022.01)
(58) Field of Classification Search
CPC .............................. G06N 10/00; G06N 10/20
See application file for complete search history.

(56) References Cited

U.S. PATENT DOCUMENTS

| | | | |
|---|---|---|---|
| 6,061,662 A | 5/2000 | Makivic | |
| 8,543,627 B1 | 9/2013 | Tucci | |
| 9,275,011 B2 | 3/2016 | Svore et al. | |
| 9,514,415 B2 | 12/2016 | Bocharov et al. | |
| 10,229,365 B2 | 3/2019 | Fuechsle et al. | |
| 11,010,450 B2 | 5/2021 | Granade et al. | |
| 11,120,359 B2 | 9/2021 | Granade et al. | |

(Continued)

FOREIGN PATENT DOCUMENTS

| | | |
|---|---|---|
| CN | 107004161 | 8/2017 |
| CN | 114631108 | 6/2022 |

(Continued)

OTHER PUBLICATIONS

Austin Gilliam et al., "Grover Adaptive Search for Constrained Polynomial Binary Optimization", Apr. 6, 2021, retrieved from arXiv database, arXiv:1912.04088v3 [quant-ph], pp. 1-11.

(Continued)

*Primary Examiner* — An H Do
(74) *Attorney, Agent, or Firm* — JCIPRNET

(57) ABSTRACT

An electronic device and method for performing Monte Carlo analysis based on a quantum circuit are provided. The method includes: exciting, by quantum gates, a plurality of qubits into a plurality of states; selecting, by a probability measurement circuit, a sampled result randomly from a plurality of operation results of a quantum circuit when measuring the plurality of quantum operation results; and computing, by the statistics computing circuit, a probability (Continued)

statistics associated with a Monte Carlo analysis from the plurality of random samples measured from the quantum operation results to obtain an average value.

12 Claims, 8 Drawing Sheets

(56) References Cited

U.S. PATENT DOCUMENTS

| | | | | |
|---|---|---|---|---|
| 11,537,771 | B2 * | 12/2022 | Pond | G06F 30/337 |
| 11,699,090 | B2 * | 7/2023 | Martiel | G06N 10/40 |
| | | | | 706/45 |
| 2020/0327269 | A1 | 10/2020 | Pond et al. | |

FOREIGN PATENT DOCUMENTS

| | | |
|---|---|---|
| CN | 115470921 | 12/2022 |
| TW | 202121267 | 6/2021 |
| TW | 202248912 | 12/2022 |

OTHER PUBLICATIONS

Yohichi Suzuki et al., "Amplitude Estimation without Phase Estimation", Jan. 27, 2020, retrieved from arXiv database, arXiv:1904.10246v2 [quant-ph], pp. 1-13.

Nikitas Stamatopoulos et al., "Option Pricing using Quantum Computers", Jul. 2, 2020, retrieved from arXiv database, arXiv:1905.02666v5 [quant-ph], pp. 1-20.

Yunseong Nam et al., "Approximate Quantum Fourier Transform with O(n log(n)) T gates", Jul. 18, 2019, retrieved from arXiv database, arXiv:1803.04933v2 [quant-ph], pp. 1-7.

Engin Sahin, "Quantum Arithmetic Operations Based on Quantum Fourier Transform on Signed Integers", Oct. 8, 2020, retrieved from arXiv database, arXiv:2005.00443v3 [cs.IT], pp. 1-23.

Peter W. Shor, "Polynomial-Time Algorithms for Prime Factorization and Discrete Logarithms on a Quantum Computer", Jan. 25, 1996, retrieved from arXiv database, arXiv:quant-ph/9508027v2, pp. 1-28.

"Office Action of Taiwan Counterpart Application", issued on Oct. 30, 2023, p. 1-p. 5.

* cited by examiner $$\int_a^b x\,pdf(x)dx \approx AVG$$

probability of a grid point randomly picked in the large square being within the $\frac{1}{4}$ circle $$\approx \frac{\text{area of } \frac{1}{4} \text{ circle}}{\text{area of large square}} = \frac{\frac{1}{4} \times \pi\, r^2}{r^2} = \frac{\pi}{4}$$

$\pi$ is about 3.25140380859375

ELECTRONIC DEVICE AND METHOD FOR PERFORMING MONTE CARLO ANALYSIS BASED ON QUANTUM CIRCUIT

CROSS-REFERENCE TO RELATED APPLICATION

This application claims the priority benefit of Taiwan Application No. 111149121, filed on Dec. 21, 2022. The entirety of the above-mentioned patent application is hereby incorporated by reference herein and made a part of this specification.

TECHNICAL FIELD

The disclosure relates to an electronic device and method for performing Monte Carlo analysis based on a quantum circuit.

BACKGROUND

Generally, traditional computers are used to perform Monte Carlo analysis to reduce the complexity from $O(2^n)$ to $O(m)$ after random sampling. But it is difficult to design a quantum circuit to perform Monte Carlo analysis for this purpose. This invention proposes a new methodology to perform the Monte Carlo analysis using quantum circuit design.

SUMMARY

An electronic device for performing Monte Carlo analysis based on a quantum circuit according to an exemplary embodiment of the disclosure includes: quantum gates, a probability measurement circuit, and a statistics computing circuit. The quantum gates are coupled to the quantum circuit, and the quantum gates excite a plurality of qubits into a plurality of states. The probability measurement circuit is coupled to the quantum circuit, and the probability measurement circuit selects a sampled result randomly from a plurality of operation results of the quantum circuit when measuring the plurality of quantum operation results. The statistics computing circuit is coupled to the probability measurement circuit, and the statistics computing circuit computes a probability statistics associated with a Monte Carlo analysis from the plurality of measured random samples to obtain an average value.

A method for performing Monte Carlo analysis based on a quantum circuit according to an exemplary embodiment of the disclosure includes: exciting, by quantum gates, a plurality of qubits into a plurality of states; selecting, by a probability measurement circuit, a sampled result randomly from a plurality of operation results of the quantum circuit when measuring the plurality of quantum operation results; and computing, by the statistics computing circuit, a probability statistics associated with a Monte Carlo analysis from the plurality of measured random samples to obtain an average value.

Several exemplary embodiments accompanied with drawings are described in detail below to further describe the disclosure in details.

BRIEF DESCRIPTION OF THE DRAWINGS

The accompanying drawings are included to provide a further understanding, and are incorporated in and constitute a part of this specification. The drawings illustrate exemplary embodiments and, together with the description, serve to explain the principles of the disclosure.

DETAILED DESCRIPTION OF DISCLOSURED EMBODIMENTS

Figure 1:
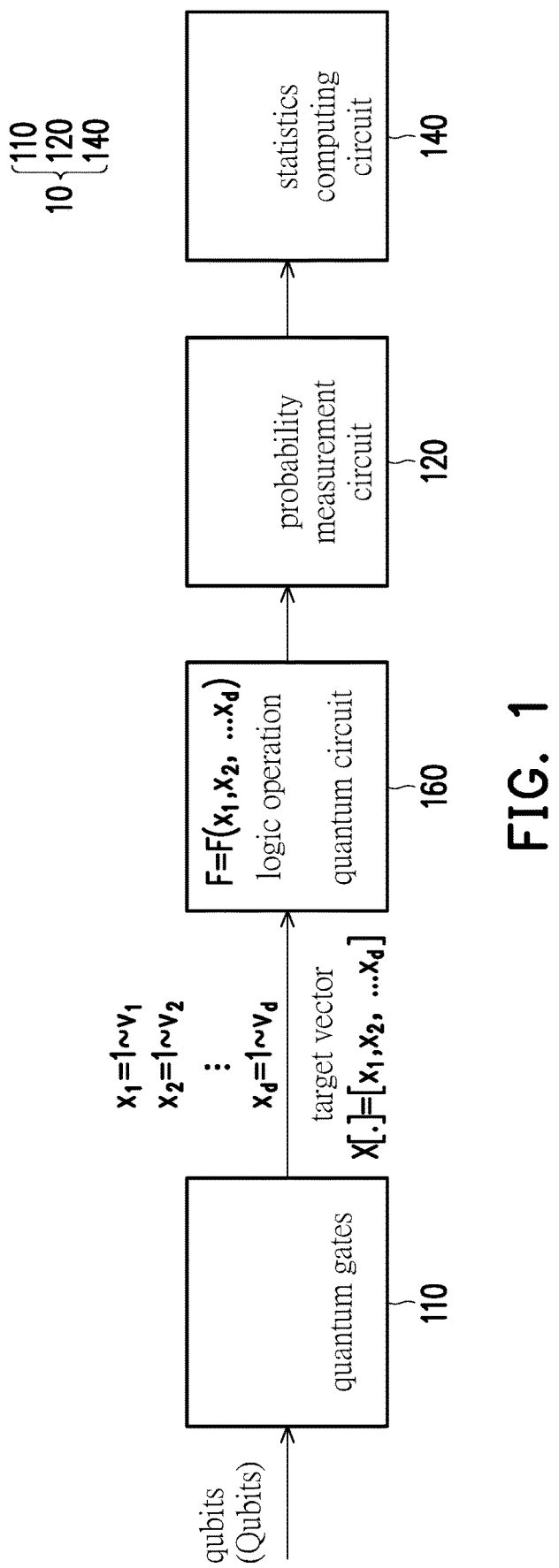
FIG. 1 is a block diagram of an electronic device for performing Monte Carlo analysis based on a quantum circuit according to an exemplary embodiment of the disclosure.

FIG. 1 is a block diagram of an electronic device 10 for performing Monte Carlo analysis based on a quantum circuit according to an exemplary embodiment of the disclosure. The electronic device 10 includes quantum gates 110, a probability measurement circuit 120, and a statistics computing circuit 140. The quantum gates 110 are coupled to a quantum circuit 160. The probability measurement circuit 120 is coupled to the quantum circuit 160. The statistics computing circuit 140 is coupled to the probability measurement circuit 120. In the present embodiment, the quantum gates 110, the probability measurement circuit 120, and the quantum circuit 160 are all executed on a quantum computer. On the other hand, the statistics computing circuit 140 is executed on a traditional computer.

In an exemplary embodiment, the quantum gates 110 may be Hadamard gates.

Figure 2:
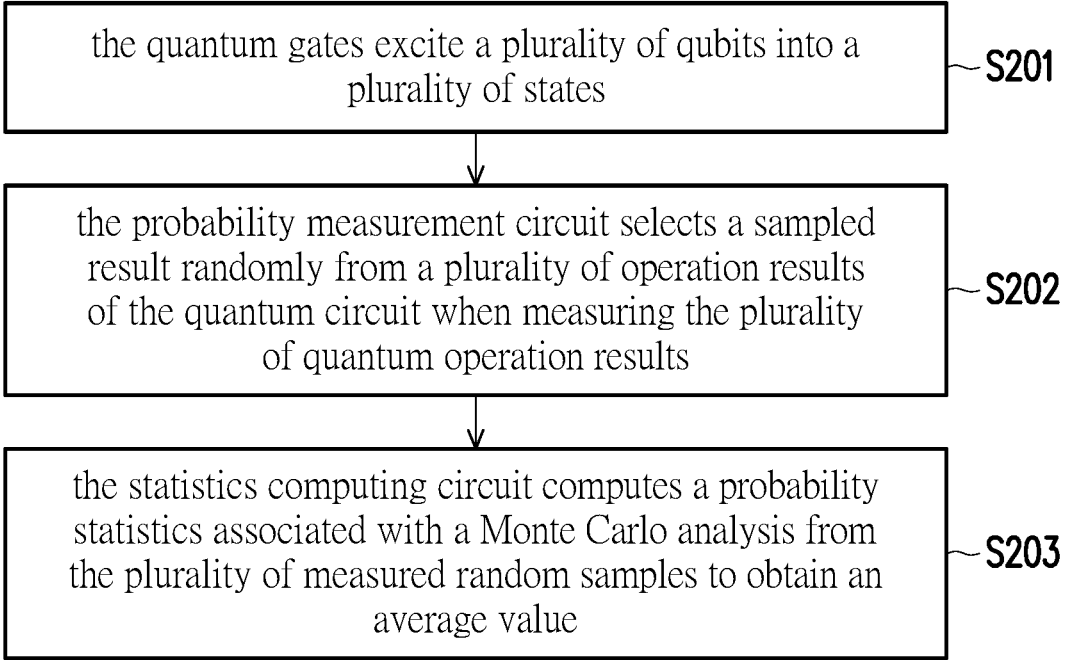
FIG. 2 is a flowchart of a method for performing Monte Carlo analysis based on a quantum circuit according to an exemplary embodiment of the disclosure.

FIG. 2 is a flowchart of a method for performing Monte Carlo analysis based on a quantum circuit according to an exemplary embodiment of the disclosure. Referring to FIG. 1 and FIG. 2, the method of this embodiment is applicable to the electronic device 10 shown in FIG. 1. In the following, the steps of the method for performing Monte Carlo analysis based on a quantum circuit in the disclosure will be described with reference to the components of the electronic device 10.

In step S201, the quantum gates 110 may excite a plurality of qubits into a plurality of states. In other words, the electronic device 10 of the disclosure may use the quantum gates 110 to implement grid picking (full picking). For example, if the number of the plurality of qubits is n, the number of the plurality of states is $2^n$, so that the quantum can be a massively parallel design mechanism. The quantum gates 110 may then input these states to the quantum circuit 160. It is assumed here that the number of the plurality of states is $2^n$, and the dimensionality of the target vector X[.] used for inputting to the quantum circuit 160 is also $2^n$. The quantum gates 110 may directly input these states to the quantum circuit 160 for the quantum circuit 160 to perform simulation/operation according to a logic operation formula F. In an exemplary embodiment, $x_1$ shown in FIG. 1 can be 0 or 1, $x_2$ can be 0 or 1, $x_3$ can be 0 or 1, . . . , and $x_d$ can be 0 or 1, but the disclosure is not limited thereto.

In step S202, the probability measurement circuit 120 may select a sampled result randomly from a plurality of operation results of the quantum circuit 160 when measuring the plurality of quantum operation results. In other words, following the description of the embodiment described above, in addition to implementing grid picking (full picking) based on the quantum gates 110, the electronic device 10 of the disclosure may use the probability measurement circuit 120 to sample the operation results (simulation results) of the quantum circuit 160 to reduce dimensionality when measuring the operation results.

In step S203, the statistics computing circuit 140 may compute a probability statistics associated with a Monte Carlo analysis from the plurality of measured random samples from quantum operation results to obtain an average value. In other words, the electronic device 10 of the disclosure may use the principle that "the sample average is approximately equal to the population mean" to compute the probability statistics from the plurality of measured random samples so as to restore the average value of a large number of results, that is, to complete a Monte Carlo analysis.

It is worth noting here that, when a traditional computer performs a Monte Carlo analysis, the traditional computer first performs sampling to reduce the dimensionality, runs simulation to test, and then estimates the real result from the simulation result. In contrast thereto, the electronic device 10 of the disclosure uses grid picking for full picking simulation/operation, and then performs random sampling from the simulation/operation results to reduce the dimensionality during quantum measurement.

Figures 3, 4:
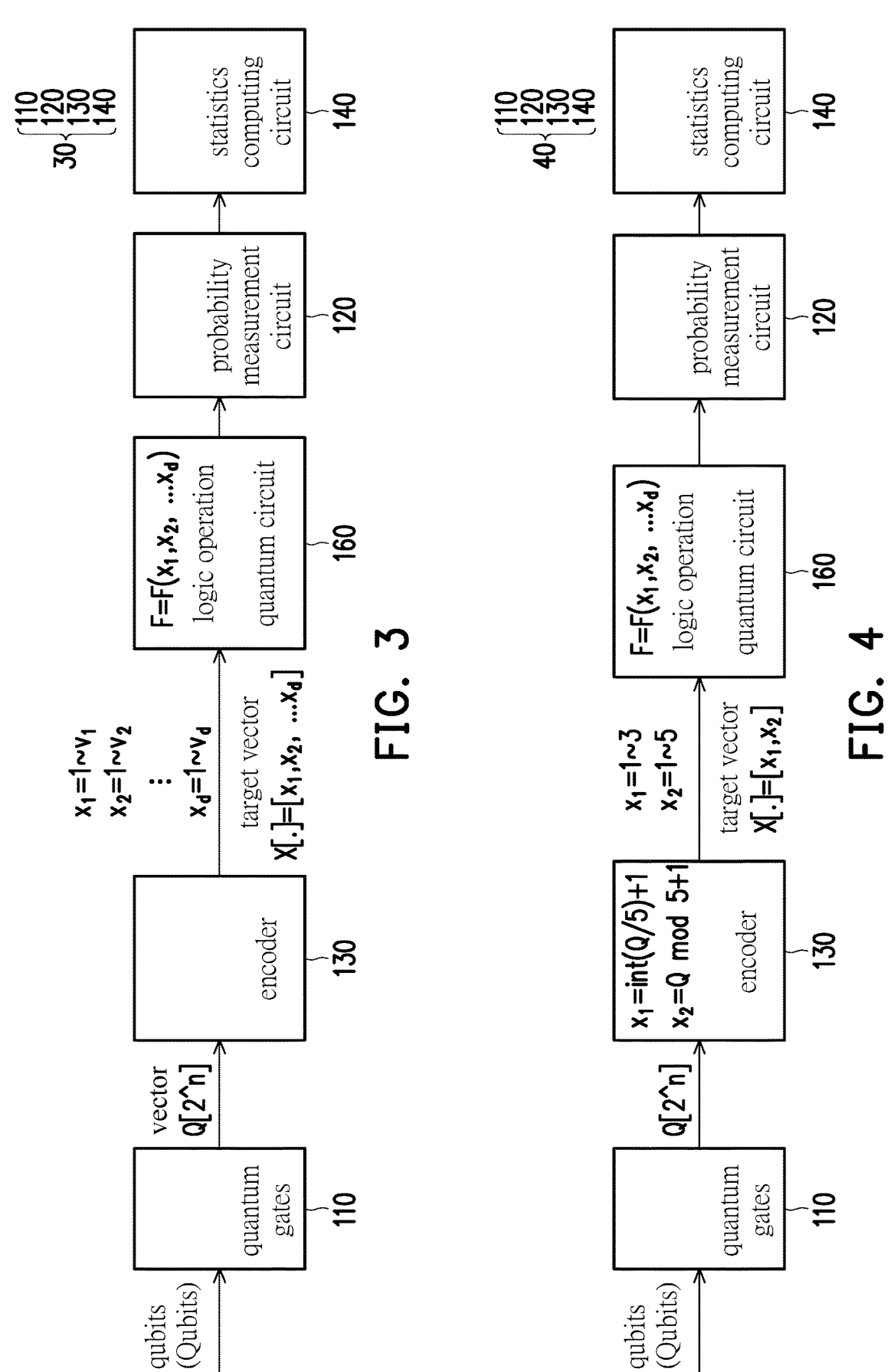
FIG. 3 is a block diagram of an electronic device for performing Monte Carlo analysis based on a quantum circuit according to another exemplary embodiment of the disclosure.
FIG. 4 is a block diagram of an electronic device for performing Monte Carlo analysis based on a quantum circuit according to another exemplary embodiment of the disclosure.

FIG. 3 is a block diagram of an electronic device 30 for performing Monte Carlo analysis based on a quantum circuit according to another exemplary embodiment of the disclosure. The difference between the electronic device 30 and the electronic device 10 shown in FIG. 1 is that the electronic device 30 may further include an encoder 130. The encoder 130 may be coupled to the quantum gates 110 and the quantum circuit 160. The encoder 130 may be a binary-to-non-binary encoder. In this exemplary embodiment, the encoder 130 may perform an encoding operation according to the plurality of states and the target vector of the quantum circuit 160. In detail, the function of the encoder 130 in this exemplary embodiment is that: if the target vector X[.] does not have $2^n$ possibilities but have many different variations, the encoder 130 can convert the vector $Q[2^n]$ into a target vector that can be input to the quantum circuit 160.

FIG. 4 is a block diagram of an electronic device 40 for performing Monte Carlo analysis based on a quantum circuit according to another exemplary embodiment of the disclosure. In this exemplary embodiment, it is assumed that the number n of qubits is 4, and it is assumed that the target vectors are $x_1$=1 to 3 and $x_2$=1 to 5. In order to utilize the Monte Carlo analysis technique to obtain the average value of all situations of $x_1 \times x_2$ (the logic operation formula F of the quantum circuit 160 being on $x_1 \times x_2$ situations), after the quantum gates excite these qubits into 16 ($Q=2^4$) states, the encoder 130 may use the following formula 1 and formula 2 to convert and obtain the target vector X[.].

$$x_1 = \text{int}\left(\frac{Q}{5}\right) + 1 \qquad \text{(formula 1)}$$

$$x_2 = Q \bmod 5 \qquad \text{(formula 2)}$$

Besides using the above-mentioned mathematical formulas, in other embodiments, the encoder 130 may also use a look-up table to implement the above-mentioned operation of "converting and obtaining the target vector".

Figures 5A, 5B:
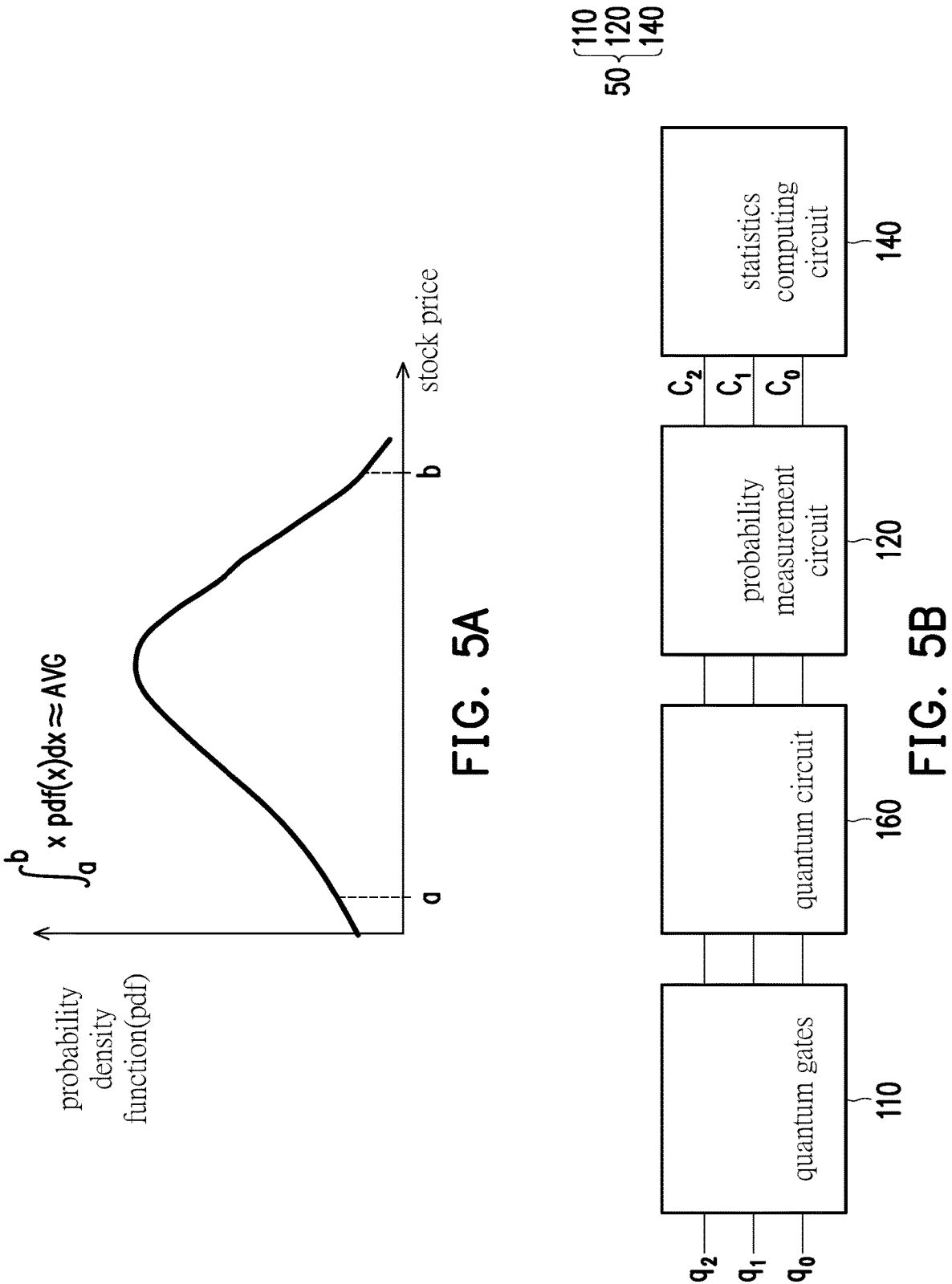
FIG. 5A is an example of a probability density function and stock price.
FIG. 5B is a block diagram of an electronic device for performing Monte Carlo analysis based on a quantum circuit according to another exemplary embodiment of the disclosure.
Figure 5C:
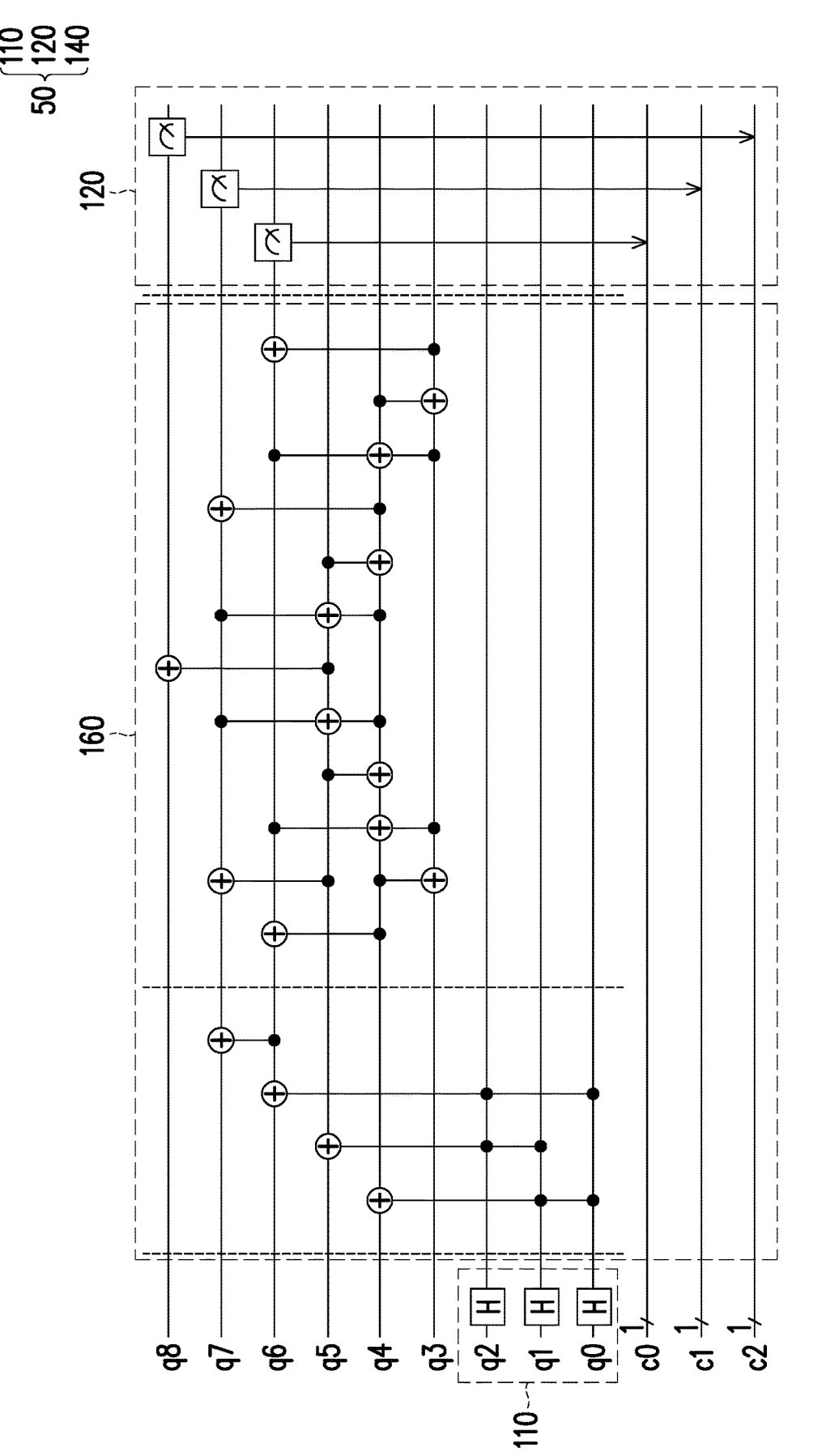
FIG. 5C is a circuit diagram of the electronic device shown in FIG. 5B.

FIG. 5A is an example of a probability density function (pdf) and stock price. FIG. 5B is a block diagram of an electronic device 50 for performing Monte Carlo analysis based on a quantum circuit according to another exemplary embodiment of the disclosure. FIG. 5C is a circuit diagram of the electronic device 50 shown in FIG. 5B. Referring to FIG. 5A, FIG. 5B, and FIG. 5C, in order to use the Monte Carlo analysis technique to approximate the expectation of the stock price (i.e. the integration between the stock price a and the stock price b shown in FIG. 5A), the statistics computing circuit 140 may use the following formula 3 to calculate the approximated stock price expectation from the sample average (AVG).

$$\int_a^b x \, pdf(x)dx \approx AVG \qquad \text{(formula 3)}$$

In this embodiment, as shown in FIG. 5B and FIG. 5C, the quantum gates 110 of the electronic device 50 may be designed with three qubits (n is 3) such as $q_0$, $q_1$, and $q_2$, and the probability measurement circuit 120 of the electronic device 50 may be designed with a binary bits code $C_2C_1C_0$ (that is, the number of bits of the bits code is 3). The $C_2$, $C_1$, and $C_0$ shown in FIG. 5B and FIG. 5C are of traditional computer signals. It is worth noting here that the qubits $q_3$ to $q_8$ shown in FIG. 5C are auxiliary qubits added for the internal operation of the quantum circuit 160, and cannot further improve the parallelism of the quantum operation.

After the quantum circuit 160 performs the simulation/operation and obtains a plurality of operation results ($2^n$=8) in parallel, the probability measurement circuit 120 may select a sampled result randomly from the plurality of quantum operation results. After a plurality of iterations of quantum operation and measurement, the statistics computing circuit 140 may perform on a traditional computer to convert the plurality of randomly sampled operation results into a probability statistics. In an exemplary embodiment, the probability measurement circuit 120 may convert each quantum operation result into the binary bits code stored in the three qubits $q_6$, $q_7$, and $q_8$ shown in FIG. 5C.

In detail, since the number of bits of the above-mentioned bits code is 3, the probability measurement circuit 120 may uniformly sample 8 points between the stock price a and the stock price b to allow the quantum circuit 160 to perform the operation of computing the probability density function in parallel, so that the quantum circuit 160 can obtain each operation result. Then, the probability measurement circuit 120 may further convert each operation result to the binary bits code stored in the three qubits $q_6$, $q_7$, and $q_8$ shown in FIG. 5C, then perform quantum measurement to randomly sample $q_6$ into $C_0$, $q_7$ into $C_1$, and $q_8$ into $C_2$. Therefore the probability of occurrence of 1 in the qubit $q_6$ can be approximated by the sample average of $C_0$ (and similarly for $q_7$ by $C_1$ and $q_8$ by $C_2$). Then, the statistics computing circuit 140 may use the approximated probability value corresponding to the bits code to compute the probability statistics associated with the Monte Carlo analysis so as to obtain the average value by using the principle that the sample average is approximately equal to the population mean. In detail, the statistics computing circuit 140 may use the following formula 4 to obtain the average value.

$$AVG = \frac{4 \times AVGC_2 + 2 \times AVGC_1 + AVGC_0}{8} \quad \text{(formula 4)}$$

where AVG is the sample average between the stock price a and the stock price b, $AVGC_2$ is the sample average of the highest bit $C_2$, $AVGC_1$ is the sample average of the middle bit $C_1$, and $AVGC_0$ is the sample average of the lowest bit $C_0$.

It should be noted that, although this exemplary embodiment is illustrated with the number of qubits being 3 and the number of bits of the bits code being 3, the disclosure is not limited thereto.

Figure 6A:
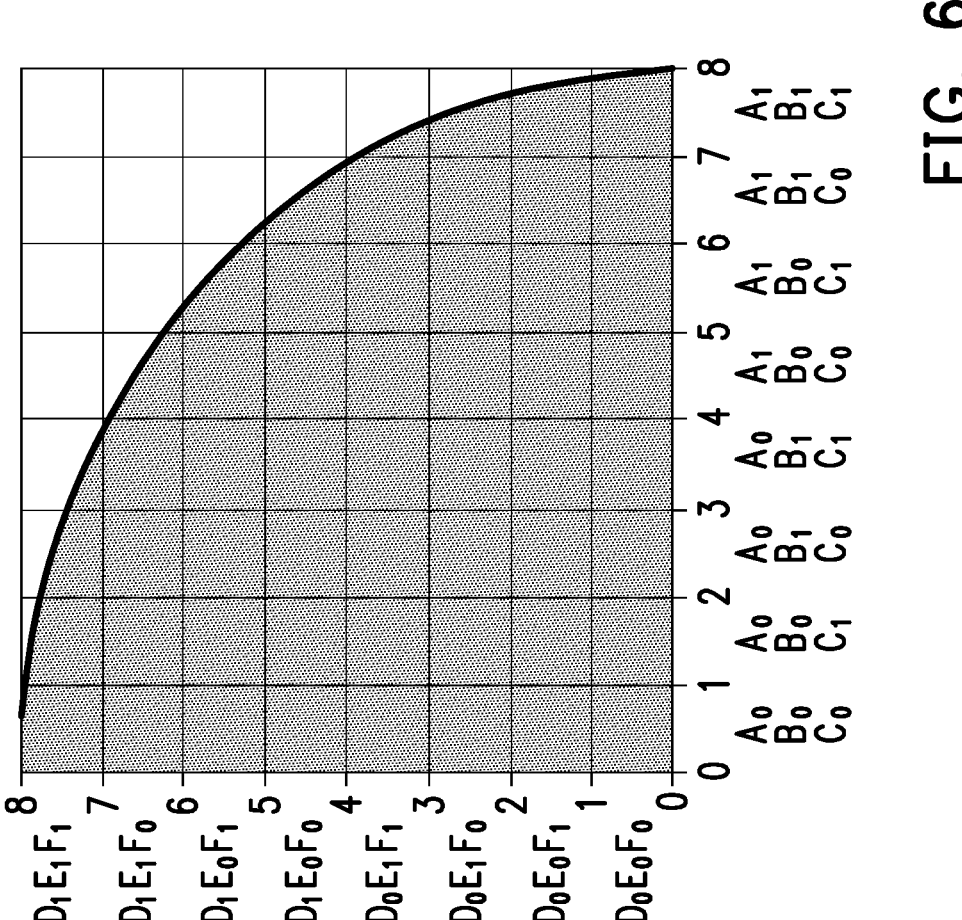
FIG. 6A is a schematic diagram of calculating $\pi$ using a ¼ circle and a square.
Figure 6B:
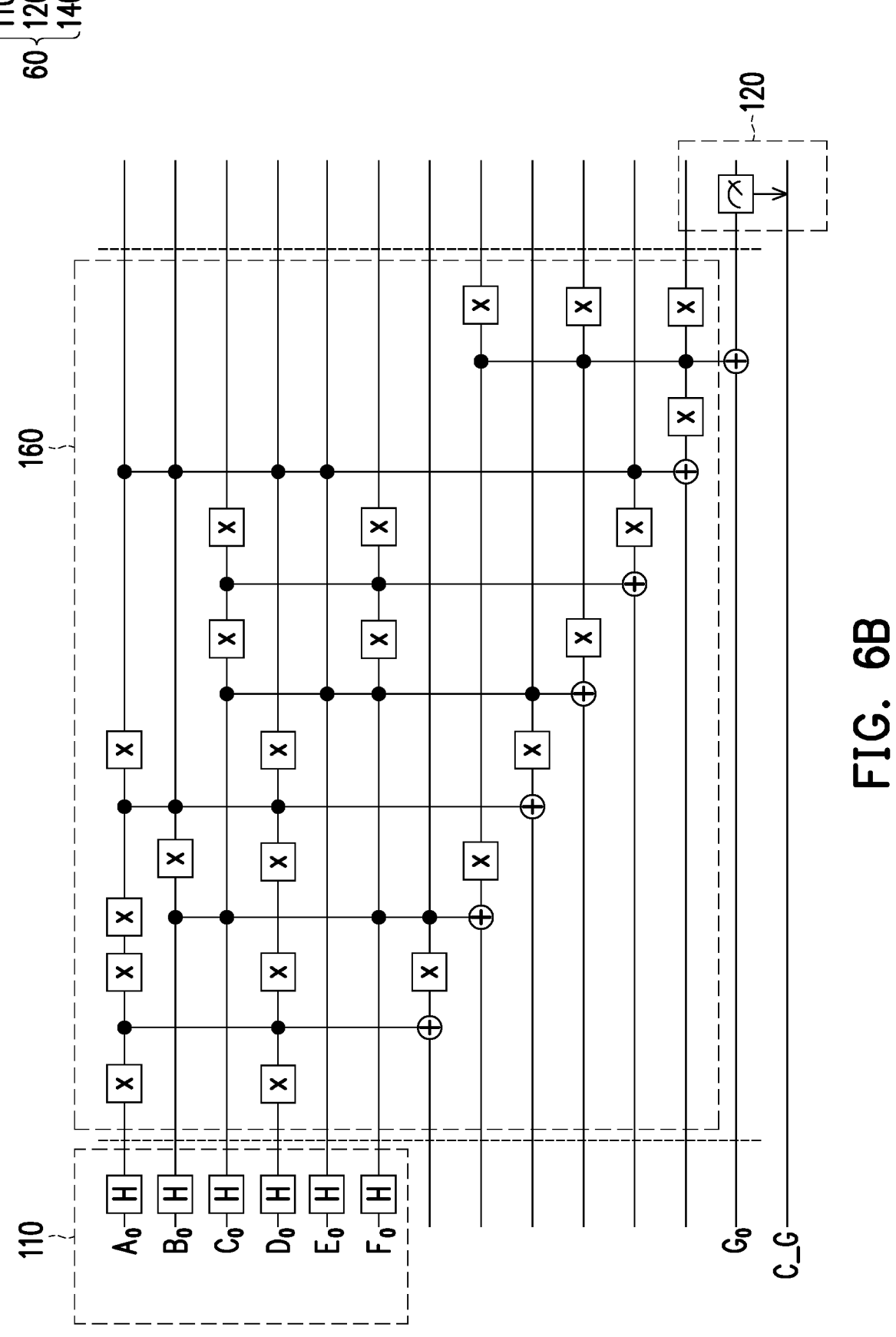
FIG. 6B is a circuit diagram of an electronic device for performing Monte Carlo analysis based on a quantum circuit according to another exemplary embodiment of the disclosure.
Figure 6C:
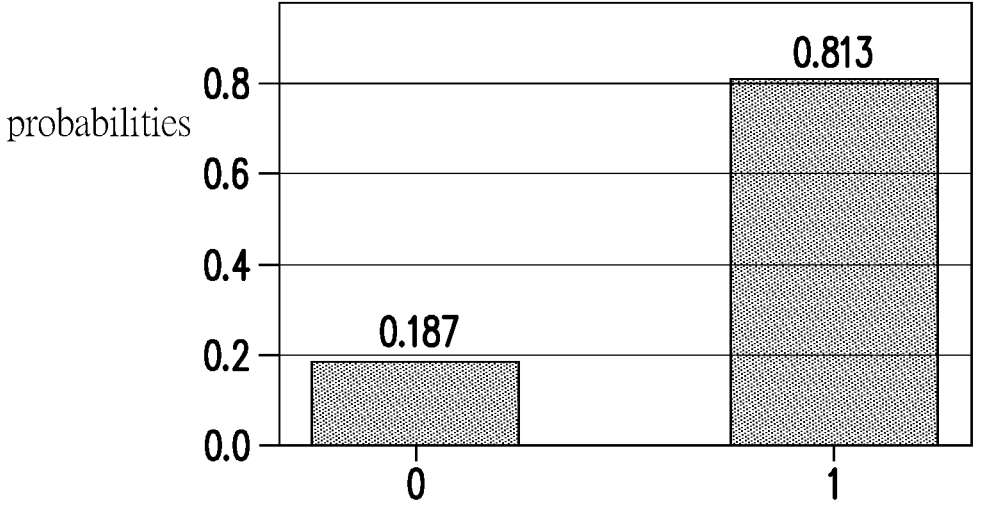
FIG. 6C is a schematic diagram of $\pi$ calculated by the electronic device shown in FIG. 6B.

FIG. 6A is a schematic diagram of calculating π using a ¼ circle and a square. FIG. 6B is a circuit diagram of an electronic device 60 for performing Monte Carlo analysis based on a quantum circuit according to another exemplary embodiment of the disclosure. FIG. 6C is a schematic diagram of π calculated by the electronic device 60 shown in FIG. 6B. Referring to FIG. 6A and FIG. 6B, in this exemplary embodiment, the logic operation formula F of the quantum circuit 160 may be the following formula 5 (to determine whether a grid point in a large square is in a ¼ circle).

$$X^2 + Y^2 < r^2 \quad \text{(formula 5)}$$

where X is the X-coordinate of a grid point within the large square, Y is the Y-coordinate of a grid point within the large square, and r is the radius of the circle (8).

In order to use the Monte Carlo analysis technique to calculate π based on the above formula 5 and the following formula 6, as shown in FIG. 6B, the electronic device 60 may adopt the design of 6 qubits such as $A_0$, $B_0$, $C_0$, $D_0$, $E_0$, and $F_0$ (n is 6), and may adopt the design of the bits code being $G_0$ (that is, the number of bits of the bits code is 1). In detail, the three qubits of $A_0$, $B_0$, and $C_0$ may correspond to the X-coordinates of the above formula 5, and the three qubits of $D_0$, $E_0$, and $F_0$ may correspond to the Y-coordinates of the above formula 5.

$$P \approx \frac{\frac{1}{4} \times \pi r^2}{r^2} => \pi \approx 4P \quad \text{(formula 6)}$$

where P is the probability of a grid point randomly picked in the large square being within the ¼ circle.

The probability measurement circuit 120 may perform quantum measurement to randomly sample the qubit $G_0$ into the classical bit $c\_G_0$ shown in FIG. 6B. Therefore, the probability of occurrence of 1 in the qubit $G_0$ can be approximated by the sample average of $c\_G_0$. Then π can be approximated according to the above formula 6. Referring to

6

FIG. 6C, in this exemplary embodiment, since the value P (the probability of a grid point randomly picked in the large square being within the ¼ circle) calculated by the electronic device 60 is 0.813, the probability measurement circuit can obtain the π to be about 3.25140380859375 according to the above formula 6.

It should be noted that, although this exemplary embodiment is illustrated with the number of qubits being 6 and the number of bits of the bits code being 1, the disclosure is not limited thereto. For example, as the number of qubits is set to be more (for example, 12, 18 or 24), the π calculated by the electronic device 60 becomes more accurate.

To sum up, the electronic device and method for performing Monte Carlo analysis based on a quantum circuit according to the disclosure can perform $O(2^n)$ full picking simulation/operation based on the principle of quantum massive parallelism, and then perform random sampling from the simulation/operation results to reduce dimensionality during quantum measurement. After O(m) iterations of quantum operation and measurement, Monte Carlo analysis can be performed.

The disclosure provides an electronic device and method for performing Monte Carlo analysis based on a quantum circuit, which can complete $O(2^n)$ times of traditional operations in parallel followed by quantum measurement, and be iterated O(m) times to perform Monte Carlo analysis. The traditional Monte Carlo design methodology is not readily applicable to the quantum circuit design thereof. The major difference in this disclosure is to adopt the parallel grid sampling prior to the random sampling by quantum measurement. In the VLSI design, high quality random number generators are costly. The non-uniformity present in random numbers generated by the traditional computer limits the precision. On the contrary, the proposed quantum circuit has the inherent advantage that the parallel grid sampling following the Hadamard gate(s) will result in measured random samples which are uniform. With uniform random samples, we can get the desired high precision by increasing the quantum qubits.

Based on the above, the electronic device and method for performing Monte Carlo analysis based on a quantum circuit according to the disclosure can perform full picking simulation/operation based on the principle of quantum massive parallelism, and then performs random sampling from the simulation/operation results to reduce dimensionality during quantum measurement. Accordingly, due to quantum massive parallelism, the $O(2^n)$ times of full grid simulation/operation can be completed in parallel, then a random sample is obtained by quantum measurement.

Each quantum operation is to complete $O(2^n)$ different traditional operations in parallel, and all the operation results are stored in the quantum system. However, each quantum measurement only obtains one result randomly from those operation results, and thus completes one iteration of quantum operation and measurement. After O(m) iterations of quantum operation and measurement, Monte Carlo analysis can be performed. Since quantum is a new field, how to use quantum circuit design to perform the Monte Carlo analysis is difficult and nonobvious. The contribution of this invention is to overcome this difficulty.

It will be apparent to those skilled in the art that various modifications and variations can be made to the structure of the disclosed embodiments without departing from the scope or spirit of the disclosure. In view of the foregoing, it is intended that the disclosure covers modifications and variations of this disclosure provided they fall within the scope of the following claims and their equivalents.

US 12,651,184 B2

7

What is claimed is:

1. An electronic device for performing Monte Carlo analysis based on a quantum circuit, the electronic device comprising:

quantum gates coupled to the quantum circuit, wherein the quantum gates excite a plurality of qubits into a plurality of states;

a probability measurement circuit coupled to the quantum circuit, wherein the probability measurement circuit selects a sampled result randomly from a plurality of operation results of the quantum circuit when measuring the plurality of quantum operation results; and a statistics computing circuit, coupled to the probability measurement circuit, wherein the statistics computing circuit computes a probability statistics associated with a Monte Carlo analysis from the plurality of measured random samples to obtain an average value, wherein $O(2^n)$ full picking operation based on a quantum massive parallelism principle is performed by the electronic device, and the selected sampled result are used to reduce dimensionality during quantum measurement, so as to perform the Monte Carlo analysis.

2. The electronic device according to claim 1, further comprising an encoder coupled to the quantum gates and the quantum circuit, wherein the encoder performs an encoding operation based on the plurality of states and a target vector of the quantum circuit.

3. The electronic device according to claim 1, wherein the probability measurement circuit converts the sampled result among the plurality of operation results into a traditional computer signal.

4. The electronic device according to claim 1, wherein the probability measurement circuit converts the plurality of sampling operation results into a binary bits code;

the probability measurement circuit converts the plurality of operation results into a traditional signal; and the statistics computing circuit computes the probability statistics associated with the Monte Carlo analysis using a probability value corresponding to the bits code to obtain the average value by using a principle that the sample average is approximately equal to the population mean.

5. The electronic device according to claim 1, wherein the quantum gates may be Hadamard gates.

6. The electronic device according to claim 1, wherein the probability measurement circuit performs a probability density function operation to obtain the plurality of quantum operation results.

7. A method for performing Monte Carlo analysis based on a quantum circuit, adapted to be performed by an electronic device comprising quantum gates, a probability measurement circuit, and a statistics computing circuit, the method comprising:

exciting, by the quantum gates, a plurality of qubits into a plurality of states;

selecting, by the probability measurement circuit, a sampled result randomly from a plurality of operation results of the quantum circuit when measuring the plurality of quantum operation results; and computing, by the statistics computing circuit, a probability statistics associated with a Monte Carlo analysis from the plurality of measured random samples to obtain an average value, wherein the method further comprising:

performing $O(2^n)$ full picking operation based on a quantum massive parallelism principle, and the selected sampled result are used to reduce dimensionality during quantum measurement, so as to perform the Monte Carlo analysis.

8. The method according to claim 7, further comprising:

performing, by an encoder, an encoding operation based on the plurality of states and a target vector of the quantum circuit.

9. The method according to claim 7, wherein computing, by the statistics computing circuit, the probability statistics associated with the Monte Carlo analysis from the plurality of measured random samples to obtain the average value comprises:

converting, by the probability measurement circuit, the sampled result among the plurality of operation results into a traditional computer signal.

10. The method according to claim 7, wherein computing, by the statistics computing circuit, the probability statistics associated with the Monte Carlo analysis from the plurality of measured random samples to obtain the average value comprises:

converting, by the probability measurement circuit, the plurality of sampling operation results into a binary bits code;

converting, by the probability measurement circuit, the plurality of operation results into a traditional signal; and computing, by the statistics computing circuit, the probability statistics associated with the Monte Carlo analysis using a probability value corresponding to the bits code to obtain the average value by using a principle that the sample average is approximately equal to the population mean.

11. The method according to claim 7, wherein the quantum gates are Hadamard gates.

12. The method according to claim 7, wherein the probability measurement circuit performs a probability density function operation to obtain the plurality of quantum operation results.

* * * * *